US012638027B2

(12) United States Patent
(10) Patent No.: US 12,638,027 B2
(45) Date of Patent: May 26, 2026

Fuchs et al.

(54) ELECTROHYDRAULIC ACTUATING DEVICE HAVING INTEGRATED ELECTRICAL FUNCTIONAL ELEMENTS

(71) Applicant: EMG AUTOMATION GMBH, Wenden (DE)

(72) Inventors: Roman Fuchs, Wenden (DE); Alexander Kabs, Hagen (DE); Peter Grella, Oschersleben (DE); Alexander Morgenstern, Freudenberg (DE); Uwe Wurster, Olpe (DE); Mike Holterhoff, Wenden (DE)

(73) Assignee: EMG AUTOMATION GMBH, Wenden (DE)

( * ) Notice: Subject to any disclaimer, the term of this patent is extended or adjusted under 35 U.S.C. 154(b) by 23 days.

(21) Appl. No.: 18/699,113

(22) PCT Filed: Oct. 13, 2022

(86) PCT No.: PCT/EP2022/078583
§ 371 (c)(1),
(2) Date: Apr. 5, 2024

(87) PCT Pub. No.: WO2023/062164
PCT Pub. Date: Apr. 20, 2023

(65) Prior Publication Data

US 2024/0410401 A1 Dec. 12, 2024

(30) Foreign Application Priority Data

Oct. 14, 2021 (DE) ..................... 20 2021 105 582.0

(51) Int. Cl.
*F15B 15/18* (2006.01)
*F15B 15/14* (2006.01)
(Continued)

(52) U.S. Cl.
CPC .......... *F15B 15/18* (2013.01); *F15B 15/1485* (2013.01); *F15B 15/2861* (2013.01);
(Continued)

(58) Field of Classification Search
None
See application file for complete search history.

(56) References Cited

U.S. PATENT DOCUMENTS 2,636,347 A * 4/1953 Grebe ..................... F15B 15/18 60/473
2,885,860 A 5/1959 Ray
(Continued)

FOREIGN PATENT DOCUMENTS

DE 2103701 A1 * 8/1972
DE 2929442 A1 * 1/1981
(Continued)

OTHER PUBLICATIONS

DE 19613503 C2 machine translation to English from PE2Esearch (Year: 2025).*
(Continued)

*Primary Examiner* — Michael Quandt
(74) *Attorney, Agent, or Firm* — McCoy Russell LLP

(57) ABSTRACT

An electrohydraulic actuation device is descried with an electric motor and a pump driven by the electric motor for the operation of a hydraulic unit with a positioning cylinder, a piston and a piston rod serving as actuation element and projecting from a housing, wherein the electric motor and the hydraulic unit are each housed in a housing part of the housing, wherein the housing part of the hydraulic unit is separated from and sealed off from the housing part for housing the electric motor, wherein the housing has at least in the area of the hydraulic unit a lateral enlargement in relation to the longitudinal axis X of the device, beyond the
(Continued)

circumference of the positioning cylinder and at least along a height of a stroke of the piston.

8 Claims, 4 Drawing Sheets

(51) Int. Cl.
*F15B 15/28* (2006.01)
*F15B 21/0427* (2019.01)
(52) U.S. Cl.
CPC ...... *F15B 21/0427* (2019.01); *F15B 15/2807* (2013.01); *F15B 2211/20515* (2013.01); *F15B 2211/62* (2013.01); *F15B 2211/6336* (2013.01); *F15B 2211/851* (2013.01)

(56) References Cited

U.S. PATENT DOCUMENTS

| | | | | |
|---|---|---|---|---|
| 2,918,796 A * | 12/1959 | Weis | F15B 15/18 60/474 |
| 3,848,411 A | 11/1974 | Strawn | |
| 6,964,162 B2 * | 11/2005 | Takahashi | F15B 21/06 60/453 |
| 10,228,031 B2 * | 3/2019 | Gentzsch | F15B 15/18 |
| 11,815,108 B2 * | 11/2023 | Kasuga | F15B 15/18 |

FOREIGN PATENT DOCUMENTS

| | | | | |
|---|---|---|---|---|
| DE | 19613503 C2 * | 6/1999 | B66F 9/072 |
| DE | 102013105446 A1 | 12/2014 | |
| EP | 3387267 B1 | 3/2020 | |
| WO | 2017198625 A1 | 11/2017 | |

OTHER PUBLICATIONS

DE 2103701 A1 machine translation to English from espacenet (Year: 2025).*
DE 2929442 A1 machine translation to English from espacenet (Year: 2025).*
ISA European Patent Office, International Search Report Issued in Application No. PCT/EP2022/078583, Jan. 19, 2023, WIPO, 2 pages.

* cited by examiner

1/4

ELECTROHYDRAULIC ACTUATING DEVICE HAVING INTEGRATED ELECTRICAL FUNCTIONAL ELEMENTS

CROSS REFERENCE TO RELATED APPLICATIONS

The present application is a U.S. National Phase of International Application No. PCT/EP2022/078583 entitled "ELECTROHYDRAULIC ACTUATING DEVICE HAVING INTEGRATED ELECTRICAL FUNCTIONAL ELEMENTS," and filed on Oct. 13, 2022. International Application No. PCT/EP2022/078583 claims priority to German Patent Application No. 20 2021 105 582.0 filed on Oct. 14, 2021. The entire contents of each of the above-listed applications are hereby incorporated by reference for all purposes.

TECHNICAL FIELD

The present invention relates to an electrohydraulic actuation device with an electric motor and a pump, driven by the electric motor, of a hydraulic unit which comprises a hydraulic piston-/cylinder-unit for an actuating of different types of component parts, elements or brake systems. Such electrohydraulic actuation devices have, in a housing, for one thing an electric motor for driving of the pump for the hydraulic oil and, for another thing, a hydraulic unit which is provided in the same and outwardly-closed housing of the device. From the housing, a piston rod projects outward which is used as an actuation element for the electrohydraulic drive of different component parts.

BACKGROUND AND SUMMARY

Such electrohydraulic actuation devices or actuators are used in different kinds of applications in mechanical engineering and in plant construction. An area of use is so-called brake thruster devices, in which the electrohydraulic actuators are used for an opening of brakes for example of crane systems. The brake thruster devices thereby serve for a brake system open in normal operation, which is ensured by the hydraulic pressure of the hydraulic unit against the force of a spring. Other areas of use of such electrohydraulic actuators or brake thruster devices are for example the displacement of doors or component parts over a predetermined stroke, which is made possible by means of the piston rod projecting from the devices.

An electrohydraulic actuation device 10 known from the prior art is shown in a lateral sectional view in FIG. 1 of the drawings. The electrohydraulic actuation device 10 comprises a housing 20 closed toward outside, which contains a hydraulic unit 3 in an upper housing part 21. The hydraulic unit 3 consists of a piston 5, which is movable back and forth in a cylinder 4 by generation of a pressure in the hydraulic oil by means of a pump 2, against a force, provided at the upper side, of one coil spring or a plurality of coil springs. The hydraulic unit 3 and the pump 2 are driven by a motor unit, arranged in a lower housing part 22, with an electric motor 1. In this embodiment, the electric motor 1 is a dry-running electric motor 1 which is sealed and separated from the hydraulic oil of the hydraulic unit 3. By means of the pressure of the hydraulic oil, the piston rod 6 serving as an actuation element is moved out corresponding to the arrow in FIG. 1 and, on stopping, is drawn in again due to the force of the coil spring.

In such electrohydraulic actuation devices 10, it is known to detect the position of the piston 5 and of the piston rod 6 as actuation means, by means of sensors. For example, on the outside at the housing 20 of the device 10, mechanically coupled position sensors 27 are mounted so that the respective position (open, closed or also intermediate position) can be detected. Such mechanical position sensors 7 or switches mounted outside on the housing have the disadvantage that it is relatively complex to mount these on the outside of the housing 2 and to couple them with the hydraulic component parts of the hydraulic unit 3 which are mainly guided on the inside. For another thing, such position sensors 27 positioned outside for the detection and display of the position of the actuation device 10 are vulnerable to damage. Also, they can easily be manipulated, so that then an inexact display of the actual position of the actuation device 10 and the displacement element thereof, namely the piston rod 6, is given. For such known electrohydraulic actuation devices 10, for determined uses a heating means is provided which, in the example of the FIG. 1, is an electric heater 26 which is mounted at the lower housing part 22 above the electric motor 1. With such a heater 26, the device is brought to a required operating temperature as required. However, in the mounting of the heater 26 in the lower housing part 22, there is the disadvantage that it takes a relatively large amount of time until the hydraulic oil in the upper housing part 21 of the hydraulic unit 3 actually reaches the required operating temperature. Therefore, with regard to such electrical functional elements in the prior art, there are considerable disadvantages regarding the mounting, controlling and monitoring of the operation of such electrohydraulic actuation devices 10.

In view of the above, it is the object of the present invention to provide an electrohydraulic actuation device which, with regard to the detection and display of the position of the actuation element, is more exact and less vulnerable to interferences from the outside and allows a more effective way of operating with a faster start of the device than before.

This object is solved by means of an electrohydraulic actuation device having the features of claim 1. Advantageous embodiments and developments of the invention are the subject matter of the dependent claims.

According to the invention, according to claim 1 an electrohydraulic actuation device is proposed with an electric motor and a pump driven therewith for the operation of a hydraulic element with a positioning cylinder, a piston and a piston rod serving as actuation element and projecting from the housing, wherein the electric motor and the hydraulic unit are each housed in a housing part of the housing, wherein the housing part of the hydraulic unit is separated from and sealed off from the housing part for housing the electric motor, wherein the device is characterized in that, at least in the area of the hydraulic unit, the housing has a lateral enlargement in relation to the longitudinal axis X of the device, beyond the circumference of the positioning cylinder and at least beyond a height of a displacement travel of the piston, for an integrated housing of in particular electrical functional elements, sensors or control components directly in the hydraulic part of the housing laterally adjacent to the hydraulic unit.

The housing of the actuation device is therefore not provided flush and directly adjacent on all sides to the hydraulic unit, but rather, at least at one side, it has a specific local enlargement or protrusion such that a specific receiving space in the hydraulic part of the device is provided for the receiving of electrical functional elements, like sensors, heating elements or other electrical functional elements. The enlargement is provided lateral to a longitudinal axis, that is, radial in relation to the displacement of the actuation device, and over a height of the stroke or displacement travel of the piston. The enlargement of the housing is formed in such a shape that a kind of integrated receiving means for electrical component parts mounted therein, like for example position sensors, heating elements, measuring systems, filling level indicators, temperature sensors etc., is provided. With such an integrated form of the direct inclusion of electrical functional elements in a lateral area of the housing in the area of the hydraulic unit, a compact form of the actuation devices is provided, protected from interferences and damage. The electrical component parts or sensors are not susceptible in relation to possible damage or impairments from outside, which for example in the area of heavy machinery is of considerable advantage. Also, the electrical functional elements or sensors mounted in the enlargement and in the lateral receiving means formed in this way are protected from manipulation, so that a long-term very exact position display, for example of the piston of the hydraulic unit, is allowed. By also using, for example, electric heating rods or the like as electrical functional elements in the enlargement of the housing part of the hydraulic unit, furthermore a fast operating readiness of the device is ensured. The hydraulic oil is directly warmed up, and it is not necessary for a heating to take place from outside in a complicated manner through housing walls or partitioning walls. A heater positioned outside of the hydraulic area, as it was known from the prior art, requires a considerably longer time until the required operating temperature is reached, as the hydraulic oil itself cannot be directly heated.

The lateral enlargement of the housing for the receiving of the electrical functional elements can have, for example, a rectangular or angular shape, projecting from the otherwise substantially circular-cylindrical configuration of the actuation device due to the piston-/cylinder unit of the hydraulic unit. On one side, the enlargement projects laterally somewhat from the housing, so that there is enough space for the direct integration of the additional electrical elements or the functional elements, like for example position sensors or electric heating rods.

According to an advantageous aspect of the electrohydraulic actuation device according to the invention, it is further provided that connections or receiving means are provided in the lateral enlargement for the electrical functional elements. The enlargement which provides the space for the integrated arrangement of such electrical functional elements, like for example heaters, position sensors or the like, is therefore realised at the same time with corresponding connections and/or receiving means. The functional elements can be directly inserted in the enlargement and easily mounted, for example in screw holes provided for this purpose at a bottom of the enlargement or at an intermediate bottom of the housing of the device. The position sensors or heating means are thereby securely fixedly held according to the invention in the inside of the housing part of the housing which is filled with hydraulic oil. The connections or receiving means for the functional elements have the advantage that an advance/provisional installation of the functional elements which are required according to respective requirements and uses of the actuation device, can also take place. For example, a construction can be provided in which merely a heating means is mounted integrated in the enlargement. Alternatively, a construction can be provided which admittedly does not comprise a heating means as functional element, but does comprise a position sensor for better detection of the position of the piston and of the piston rod of the hydraulic unit. Also a combination of both, namely on the one hand an electric heating and additionally an integrated position detection means, is made possible with such a shape according to the invention of the local, radial enlargement in the housing part with connections and receiving means.

According to an advantageous embodiment of the invention, the lateral enlargement of the housing forms a receiving area for functional elements which is approximately rectangular in cross-section. The electrical functional elements or at least an electrical functional element can in this way be inserted in a space specifically formed for this in the housing and be assembled there. The functional elements are thereby not freely accessible anymore from the outside after a completion of the actuation device and in this way they are well protected from damage, a manipulation, etc. With such an approximately rectangular lateral enlargement, a kind of box-like lateral space is provided directly adjacent to the piston-/cylinder unit of the hydraulic unit, which extends in height along at least the travel of the piston and which enlarges the inside space, filled with hydraulic oil, of the housing of the device quasi for this kind of electrical additional functions. Alternatively to the rectangular shape, the enlargement can also have a kind of trapezoid shape or cuboid-like shape, and the projecting edges and corners of the enlargement can be formed slightly round or rounded.

According to an advantageous aspect of the invention, the lateral enlargement of the housing is provided with connection openings for electrical connections to an outside of the housing or directly to a terminal box. The connection openings can be provided as simple bores or through-holes in a housing part of the housing of the device inside the enlargement. With such connection openings, the functional elements projecting inwards into the fluid area of the hydraulic oil can directly be simply assembled, secured and sealed in the housing. As a result, the required electrical connections and electrical lines are positioned in the inside of the housing in a dry area separated from the hydraulic oil. A direct connection or embodiment of the openings, for example, to a terminal box for electrical connections of the device, here allows the wiring to be carried out directly inside the terminal box which is present anyway, for the connections, terminal strips or controls required for the operation of the electrohydraulic actuation device. Or the connection openings are provided at a partitioning bottom or at a housing wall, for example as thread holes.

According to a further advantageous embodiment of the invention, the electrical functional elements comprise at least a contact-free, magnetic-induction sensor which is arranged and configured for position detection of the piston by means of at least a magnet mounted thereon. In this way, a magnetic-induction sensor positioned in the inside of the hydraulic oil of the hydraulic unit is provided, which can be realized for example as a Reed switch. At for example an outer circumference of the piston, at least a permanent magnet or a plurality of permanent magnets is mounted, so that by means of a sensor element in the form of such a Reed switch extending parallel thereto and along the height of the travel of the piston, an exact position detection can take place. According to an advantageous aspect of the invention, magnets are provided at a front surface of the piston for the position detection with the sensor or sensors arranged in the lateral enlargement. Therefore, the respective position of the piston inside the actuation device can be detected contact-free and very exactly due to the spatial proximity. In this way, it can be determined for example whether the device is in a position "open" or "closed". The respective switching points at the, for example, tubular electromagnetic sensor arranged in the enlargement can thereby be adjusted in advance such that a remaining stroke up to a stop at an end inside the cylinder of the hydraulic unit can also be adjusted. Also, according to requirement and case of application, different end positions can be adjusted in advance and even variably changed again later by means of the arrangement and positioning of the switching elements of the magnetic-induction sensor which are positioned at the side in the enlargement. Therefore the device has an exact position determination of the piston, provided in the inside of the housing in the hydraulic oil itself and adjacent to the piston, and protected from damage, manipulation or other influences from the outside.

According to a further advantageous embodiment of the invention, the actuation device as an electrical functional element comprises at least an electric heating means which projects into the hydraulic oil of the hydraulic unit. The heating means, which can for example be a simple, electrically driven heating rod, a heating coil or a panel heating, is itself mounted in the lateral enlargement directly in the hydraulic oil. Thereby, an operation temperature of the actuation device can be reached more quickly after a start. The warming-up of the hydraulic oil takes place directly inside the hydraulic oil itself in the hydraulic unit and not anymore from outside, as was the case in the prior art up to now.

According to a further advantageous embodiment of the invention, the lateral enlargement of the housing is provided above and in continuation of a terminal box for electrical connections of the actuation device. The lateral enlargement, which can be formed for example in the form of an angular laterally arranged area at least of an upper housing part, is therefore provided adjacent to the terminal box and in continuation to the terminal box with approximately the same outer dimensions. Thereby, the connection of the electrical functional elements in the inside of the enlargement can be easily realized. By means of through-holes or bores in a housing part or in a wall of the terminal box or of a partitioning bottom, the connections and wirings of the electrical functional elements can be directly provided in the central terminal box of the device itself. Alternatively, the electrical functional elements can also be connected in another way, for example by connection cables and sensor lines led to the outside. The possibilities for use and the variability of embodiment in connection with the additional options of electrical functional elements of such actuation devices are thereby greatly increased. The terminal box itself of the device, which is provided for the electrical connections of the electric motor and the like, can thereby be assembled for example as a connected separate box at a lower housing part. The terminal box can also be realized by means of a box-like shaping of the lower housing part of the actuation device. The terminal box is provided with corresponding connections and openings for electrical wires or sensor wires and usually provided with a cover closed by means of threaded connections, which allows an access to the electrical connections even after a finishing of the actuation device, also in later operation, and for the adjustment and adaptation of the device. The enlargement is advantageously formed directly adjacent, that is in a kind of continuation, to the terminal box of the device. The enlargement therefore has a similar dimension and extension toward the outside along the whole housing, so that no interfering, projecting parts are present which could easily lead to damage of the component parts in operation in for example heavy engineering.

According to a further advantageous embodiment of the invention, the housing is provided at the inside of a wall of the enlargement with a recess for forming an enlarged receiving area for the electrical functional elements. The wall in the area of the enlargement is quasi formed with a for example rectangular recess, so that even with relatively compact constructional shape of the device, here enough space is provided for the housing of an electrical functional element or alternatively a plurality of electrical functional elements, like for example a heating rod and a position detection sensor.

According to a further advantageous embodiment of the invention, the electrical functional elements or the at least one electrical functional element in the hydraulic part of the housing inside the lateral enlargement, have/has an encapsulated constructional shape. The magnetic-induction sensor is for example provided encapsulated inside an aluminium tube which extends parallel to the longitudinal axis X of the actuation device and thus parallel to the piston rod. The switching contacts inside the encapsulated tubular shape of the sensor are therefore protected from the hydraulic oil and nevertheless allow an exact position detection and position determination of the piston due to the spatial proximity. The heating can for example be provided as an encapsulated heating rod in the form of an electrical thermal resistance inside a tube, or in the form of a panel element. The encapsulated form of the heating element can be realized from different materials, like for example stainless steel, copper, but also aluminium. Therefore, the electrical functional elements in the lateral enlargement of the housing inside the hydraulic unit are protected from the hydraulic oil and can nevertheless be assembled directly adjacent to and near to the hydraulic parts and above all inside the hydraulic oil itself.

According to a further advantageous embodiment of the invention, connections or receiving means of the functional elements or of the at least one functional element are provided in a partitioning bottom between the housing part of the hydraulic unit and the housing part of the electric motor. Such a partitioning bottom can for example be provided as an intermediate element between an upper housing part and a lower housing part for partitioning and sealing off the hydraulic unit filled with hydraulic oil from a dry area in the other housing part. In this way, for example also a dry-running electric motor can be used for the drive of the pump of the hydraulic unit. According to the invention, such a sealed-off partitioning bottom directly has the receiving means and connections for the electrical functional elements. The sealing-off and the assembly are thereby further facilitated for the functional elements. A rather compact constructional shape is therefore possible. The electrical connections can be directly provided in the area opposite the receiving means to the hydraulic part. For example, the receiving means or connections for the functional elements can be realized as screw holes provided with inner threads, which are simply incorporated into the partitioning bottom, and the elements have corresponding outside threads. Therefore no separate connection element or bracket is required for the electrical functional elements, as these can be directly integrated into the partitioning bottoms, which are present anyway, inside the housing. The preassembly, setting-up, maintenance and assembly of the elements is therefore further considerably simplified.

BRIEF DESCRIPTION OF THE FIGURES

Further features, aspects and advantages of the present invention are described in more detail in the following by means of different embodiments of the invention with regard to the attached drawings and the Figures included therein, wherein.

DETAILED DESCRIPTION

Figure 1:
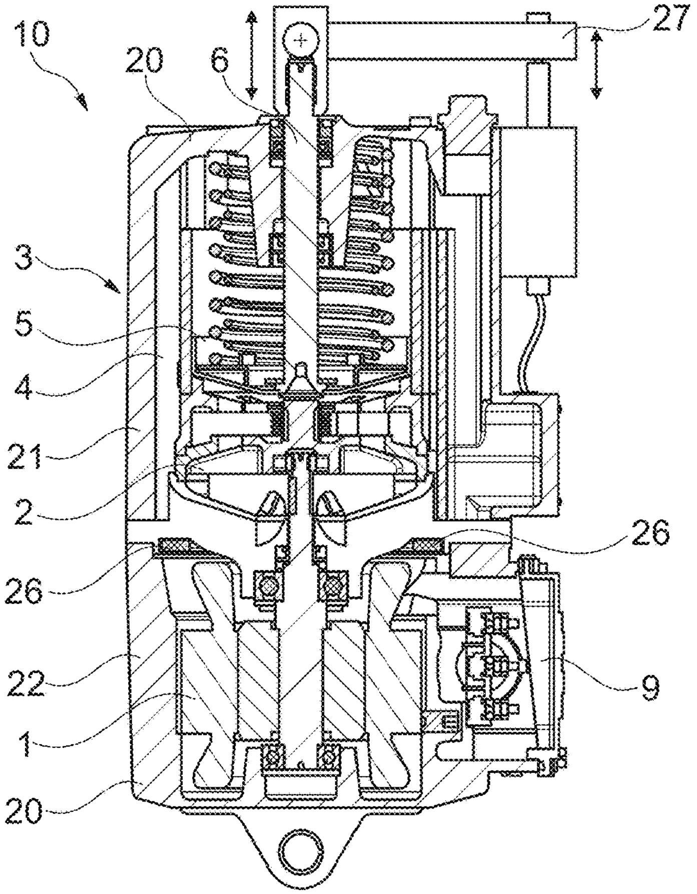
Fig. 1 Prior Art
FIG. 1 shows a vertical sectional view of an electrohydraulic actuation device according to the prior art with a mechanical position sensor at the outside of the housing.

FIG. 1 shows an electrohydraulic actuation device 10 known from the prior art, with a housing 20, in the inside of which for one thing the hydraulic unit 3 is provided with the hydraulic pump 2 and for another thing an electric motor 1 provided in a lower housing part 22 is provided, which serves for the drive of the hydraulic pump 2. The actuation device 10 is driven by the electric motor, by means of the hydraulic oil in the upper housing part 21 with the pump 2 being put under pressure, so that a piston 5 inside a cylinder 4 moves against the force of a mechanical spring in the inside of the housing 20. Hereby, the piston rod 6 projecting outwards from the housing 20 serves as the actuation device. For detecting and controlling the position and location of the actuation device 10, so-called position sensors are used, as indicated in the example of FIG. 1 in the form of an outer mechanical switch 27. The mechanical switch 27 is linked to the outward-projecting part of the piston rod 6, so that respective end positions, like for example "open" and "closed," of the actuation device 10 can be detected by the mechanical switch 27. In the lower housing part, which is separated and sealed off from the upper housing part 21 housing the hydraulic unit 3, there is a heating means 26 which serves to bring the device 10 to a required operating temperature when the device 10 is switched on. Hereby, it has proved disadvantageous that a relatively large amount of time is required until an operation temperature is reached by the heating 26. For another thing, the known form of the actuation device 10 has the disadvantage that the position detection must be mounted at the housing 20 from the outside, so that for one thing the risk of damage exists and for another, the exactness of the measurement of the position signals can be impaired.

Figure 2:
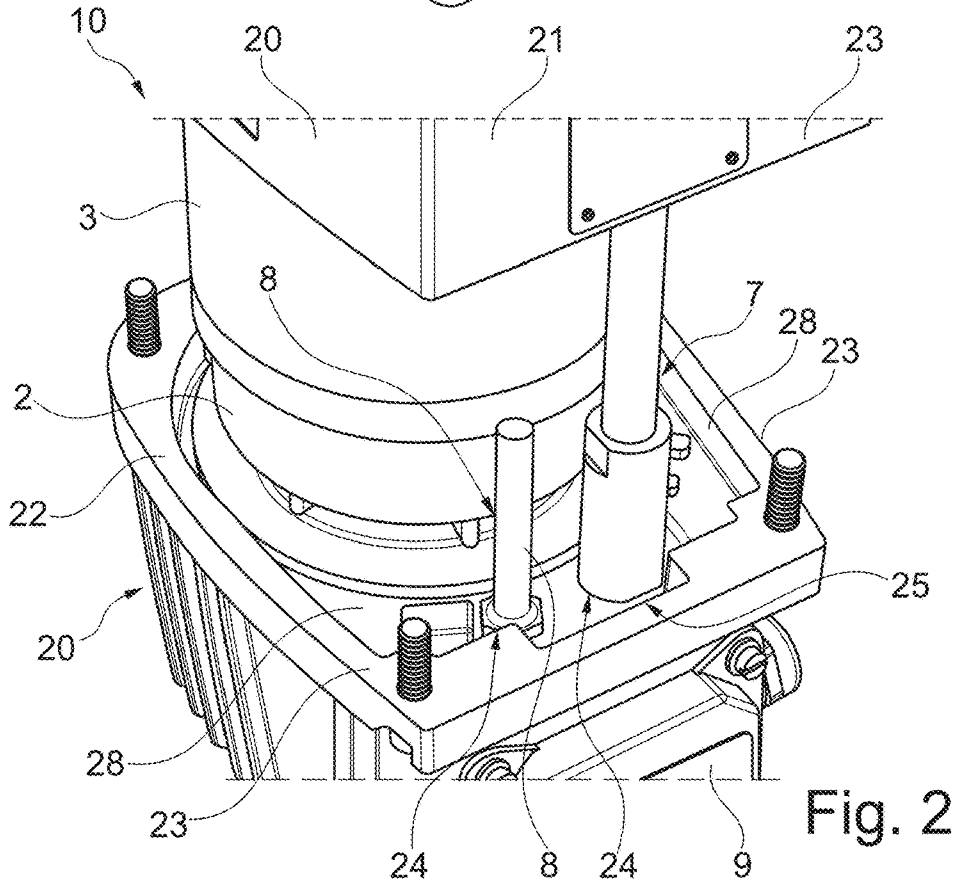
FIG. 2 shows a partial perspective view with housing parts, separate from one another, of an embodiment of an electrohydraulic actuation device according to the invention with integrated position sensor and heating element.

An embodiment of an electrohydraulic actuation device 10 according to the invention is shown in the perspective partial view of FIG. 2 with opened housing 20. The actuation device 10 comprises here too a housing 20 consisting of at least an upper housing part 21 for housing the hydraulic unit 3 and a lower housing part 21. In FIG. 2, the upper housing part 21 is taken off from the lower housing part 22 and lifted, so that the inside of the actuation device 10 is recognizable for illustrating the invention. The lower housing part 22 serves to house an electric motor 1, which is separated from the upper housing part 21 filled with hydraulic oil by means of a sealed-off partitioning bottom 28. The housing 20 is provided with a lateral enlargement 23 in the shape such that beyond the outer circumference of the hydraulic unit 3 the housing 20 is laterally lengthened and widened around an approximately rectangular area above the terminal box 9. In this way, a receiving space results between the outer wall of the housing 20 and the outer circumference of the hydraulic unit 3, which consists of the piston-/cylinder unit and the hydraulic pump 2. With the lateral enlargement 23 formed in this way, electrical or other functional elements 7, 8 can be arranged and assembled directly in the hydraulic oil in the inside space of the upper housing part 21. For example, as an electrical functional element, a heating means 8 or a heating element in the form of a heating rod or the like can be assembled and mounted there. For another thing, a position sensor 7 can also be mounted at the place of the lateral enlargement 23, which radially slightly widens the housing 20 outwards. In the embodiment shown in FIG. 2, a heating means 8 and a contact-free, magnetic-induction sensor 7 in the form of a Reed switch are mounted, so that the functional elements 7, 8 allow both a warming-up of the hydraulic oil directly in the hydraulic oil itself and an exact position detection of the piston 5 and therefore of the piston rod 6 of the actuation device 10.

In this way, a kind of integrated technical additional function or a plurality of additional functions is provided in the electrohydraulic actuation device 10 according to the invention. The heating means 8 and/or the position sensor 7 can be housed and assembled as electrical functional elements 7, 8 in the housing area of the lateral enlargement 23 of the housing 20. The functional elements 7, 8 are therefore provided in a protected manner in the inside of the housing 20 and not vulnerable to manipulation or damage or influences from outside. By means of the proximate arrangement of a magnetic-induction sensor 7 at the piston provided with a permanent magnet (not shown in FIG. 2), of the hydraulic unit 3, a very exact position determination and an exact position signal for the control and monitoring of the actuation device 10 can also be achieved. In this embodiment of FIG. 2, in an inside wall of the housing 20 there is a kind of rectangular recess 25 which enlarges the mounting space for the electrical functional elements 7, 8 without excessively enlarging the outer dimensions of the device 10. The position sensor 7 and the heating means 8, here mounted in the enlargement 23 as examples of electrical functional elements 7, 8, are provided in an encapsulated constructional shape, that is, sealed off in relation to the hydraulic oil in the upper housing part 21. At the magnetic-induction sensor 7, for example an aluminium tube with screw side surfaces is provided, while at the heating means 8 an encapsulated tubular shape of for example stainless steel, copper or also aluminium can be present. With the housing 20 formed in this way with the lateral enlargement 23, a lateral receiving space for the functional elements 7, 8 is provided in the inside of the hydraulic area. Preferably, connection openings 24, for example in the form of holes provided with threads, are present in the enlargement, by means of which the electrical functional elements 7, 8 can be directly mounted and secured. The electrical connections are then outside of the hydraulic area, namely for example in an electric terminal box 9 positioned thereunder or in a dry area provided below a partitioning bottom 28 in which, in this example, a dry-running electric motor 1 (not shown in FIG. 2) is also housed.

Figure 3B:
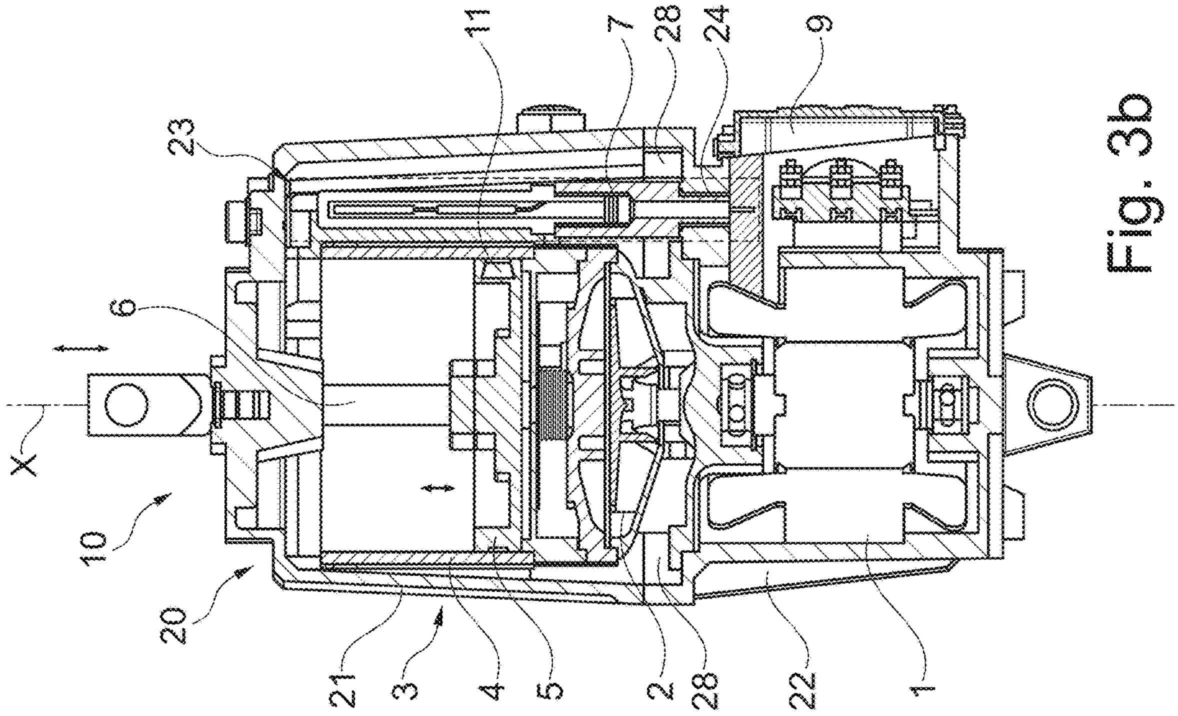
FIG. 3*b* shows a vertical sectional view of an electrohydraulic actuation device of the embodiment of FIG. 3*a;*
Figure 3A:
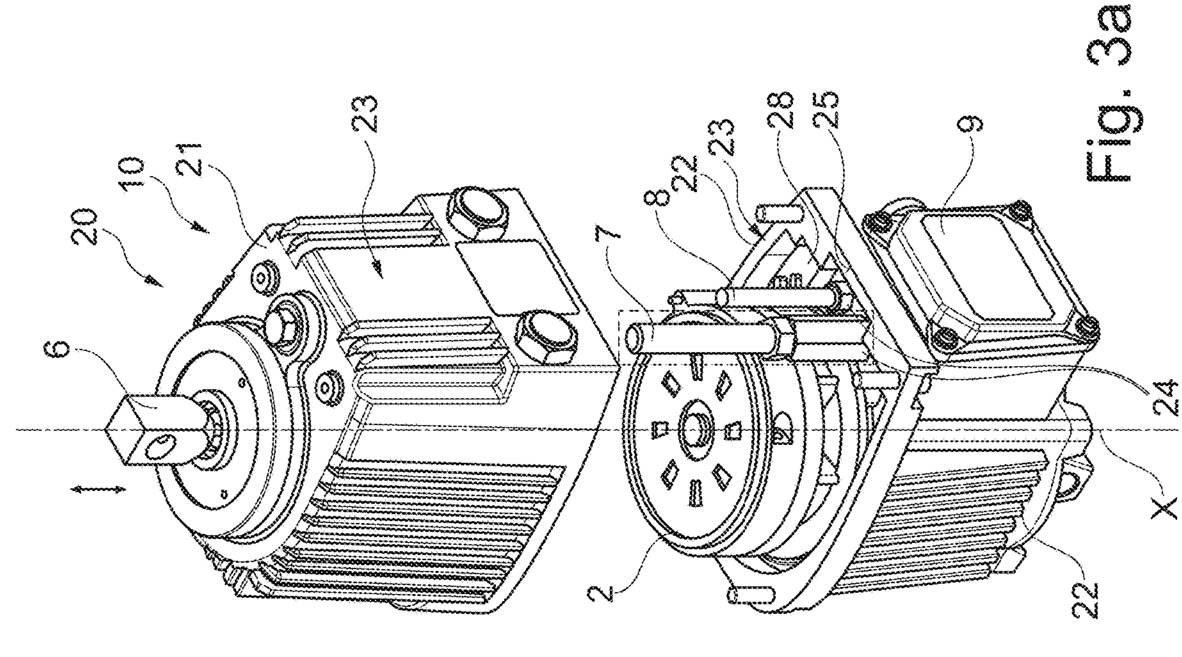
FIG. 3*a* shows a perspective view of an embodiment of an actuation device according to the invention with opened housing parts and a position sensor and a heating means.

FIG. 3*a* and FIG. 3*b* each show, in a perspective view (exploded) and a vertical sectional view, a further embodiment of an electrohydraulic actuation device 10 according to the invention. Here too, the housing 20 is provided on a side with an enlargement 23, which serves to house electrical functional elements 7, 8, like for example a magnetic-induction sensor 7 or a heating element 8 or other kinds of functional elements or additional modules. The enlargement 23 is provided laterally and at least along the height of the travel of the piston 5, so that a magnetic-induction position sensor 7 can be housed in the enlargement 23 in the inside of the hydraulic area of the device 10. Parallel to the travel of the piston 5, the precise, exact position of the actuation device 10 is therefore detected by a position sensor 7 positioned on the inside in the form of the magnetic-induction sensor 7. The sensor 7 has at least two switch elements or Reed contacts, which cooperate with a permanent magnet 11 mounted at the piston 5. At the piston 5, there can be a single magnet 11. Alternatively, also a plurality can be provided, for example three magnets 11 mounted at a distance from one another at an outer area of the piston 5. In the latter case, also in the case of a displacement rotation position of the piston 5 the exact respective position of the actuation device is made possible by means of the detection with the proximately arranged sensor 7 in the lateral enlargement 23. As shown in FIG. 3*b*, the magnets 11 can be mounted at a radial outer edge of the piston 5 toward the cylinder 4. Alternatively, the magnets 11 or the magnet 11 can be mounted at a front-end lower surface of the piston 5. In the latter case, the magnets 11 are near enough to the sensor 7, which is provided directly adjacent to them, for an exact position detection of the piston; however, they do not interfere with the function of the piston 5 in the cylinder 4, namely in particular the sealing off by means of piston sealing rings etc. On reaching the level of a Reed contact of the sensor 7, the magnetic field of the magnet 11 actuates the switch, and a position signal for position determination of the actuation device 10 and of the piston 5 or of the piston rod 6 is transmitted to a control, for example in the inside of an electric terminal box 9.

Because the magnets 11 or the magnet 11 is/are arranged at the piston 5 at an outer edge area either at a front end or at the radial outside, these are very near to the detection area of the sensor 7, which can for example be a magnetic-induction sensor or Reed contact. The sensor can therefore very exactly determine the inside position of the piston 5 in relation to the cylinder 4 and the housing 20, in order, for example, to optimize the exact control of a brake thruster device. The position of an opened brake and of a closed brake can therefore be determined just as exactly, even in the case of changing external circumstances and so, with that, of a slight displacement of the end positions of the brake thruster device. Also, in this way, exact intermediate positions can be easily determined, or the optimized monitoring of the electrohydraulic brake thruster device for a so-called reserve stroke or remaining stroke, which in some cases of application of such actuation devices 1 is essential for example for the wear of the brakes, can be considerably improved in this way. As a sensor 7, also a plurality of sensors 7 can be mounted inside the lateral enlargement 23. The sensors 7 are connected to a control and can be either adjusted in their position and location in advance by the factory, or can also be positioned such that they are subsequently changeable in position and location. In any case, due to the housing in the lateral enlargement 23, they are securely housed directly in the inside of the hydraulic part of the housing 20, 21. An adjustability, assembly or positioning of the sensors 7 in the lateral enlargement 23 can be made possible by means of corresponding openings, for example by a plug or removable parts of the housing 20.

Also in this embodiment of the FIG. 3*a* and FIG. 3*b*, the housing 20 is substantially constructed of two housing parts 21, 22, wherein this is not limiting for the invention, and more than two housing parts or only one housing part 21 can be provided. The hydraulic part of the actuation device 10, namely the pump 2 and the piston-/cylinder unit 4, 5 is provided in an upper housing part 21. The pump 2 is driven by means of an electric motor 1 in a second part 22 of the housing 20 positioned therebelow, by means of the motor drive shaft engaging/acting through a partitioning bottom 28 by means of bearings and seals and driving the pump 2 for the generation of a hydraulic pressure in the hydraulic oil of the hydraulic unit 3.

Here too, the displacement of the piston 5 takes place against a (not shown) mechanical coil spring, so that after the ending of the actuation of the pump 2 a reset into the initial position takes place automatically as shown in FIG. 3*b*. With the detection of the exact position of the piston 5 in the inside of the hydraulic unit 3 by means of the magnetic-induction sensor 7 likewise arranged in the hydraulic oil, in this way a very exact determination of the operating conditions in the inside of the device 10 can be provided. The quality of the position signals is also independent of outside influences and manipulations. Also, no damage of the position sensor 7 from outside can take place, as this is housed in a closed inside area, namely the space of the lateral enlargement 23, directly in the upper housing part 21 of the housing 20 of the device 10.

As in the previous embodiment of FIG. 2, also in this embodiment of FIG. 3*a*, FIG. 3*b* the lateral enlargement 23 is provided in a rectangular shape and quasi engages the terminal box 9 for the electrical connections of the device 10. The enlargement 23 has as before and as can be seen from FIG. 3*a* an inner recess 25 at an inside wall, which enlarges the housing space for the electrical functional elements 7, 8 or other additional modules or component parts without an excessive increase in the outer dimensions of the device 10. The lateral enlargement 23, which provides a kind of radial additional space adjacent to the area of the hydraulic unit 3, is used in this embodiment for the housing of two electrical functional elements 7, 8, namely on the one side a magnetic-induction sensor 7 and on the other side a heating means 8 in the form of a heating rod projecting parallel to the sensor 7. Both are provided in encapsulated constructional form, so thus protected they can be used in the inside of the hydraulic oil for a long-term function.

The assembly and securing of the electrical functional elements 7, 8 takes place in this embodiment by means of connection openings 24, which are inserted in a partitioning bottom 28. Therefore, for example by means of threaded connections with inner threads and outer threads, the sensors 7 and heating means 8 can be easily assembled at the inside of the housing 20 and without extra securing means. Hereby, the electrical connections are positioned outside of the upper area of the first housing part 21 filled with hydraulic oil, namely either directly in the terminal box 9 for electrical connections or in an area of the lower housing part 22 for the electric motor 1, which in this embodiment is a dry-running electric motor 1. Alternatively, the connection openings 24 can also be provided such that the signal lines and connection component parts are directed outwardly from the housing 20, so that independently of the terminal box 9 a possibility for connection at outside control means etc. is rendered possible. As also in the previous embodiment, the first housing part 21 and the second housing part 22 are provided with outside cooling fins at the outer circumference. The assembly and securing of the housing parts 21, 22 takes place by means of accordingly-shaped flange parts and threaded connections, as can be seen in FIG. 3*a* in the exploded perspective view. At the partitioning bottom 28 between the upper housing part 21 and the lower housing part 22, corresponding seals can be provided in order to provide a sealed constructional shape of the hydraulic unit 3 in relation to the lower housing part 22 for the electric motor 1 and possible further electrical parts.

The lateral enlargement 23 is a kind of radial, local enlargement of the housing 20 in relation to the longitudinal axis X of the electrohydraulic actuation device 10. The lateral enlargement 23 in these embodiments is provided at a side corresponding to the side at which also the electrical terminal box 9 is provided. At the part of the enlargement 23 of the housing 20 in this embodiment, cooling fins of the housing 20 are likewise provided at the outside. The upper first housing part 21 for the hydraulic unit 3 and the lower housing part 22 in this embodiment are formed as a kind of cup shape with closed sides on all sides, wherein the assembly takes place by means of correspondingly shaped and matching assembly flanges and threaded connections. The housing parts 21, 22 can also be formed differently, and the housing 20 can also be constructed from more than two parts. In the embodiment shown, as can be seen from the sectional view in FIG. 3*b*, the electrical terminal box 9 is formed integrally with the lower housing part 22, for example by means of a casting part. The terminal box 9 can however also be made separately from the lower housing part 22 and then threadedly connected. The lateral enlargement 23 of the housing according to the invention for electrical functional elements 7, 8 or additional component parts, can be formed as shown, with a rectangular recess 25 at the inside wall of the housing 20, or without this recess 25. The shape and kind of electrical functional elements 7, 8 can be different, likewise the number of connection openings 24 provided for such functional elements. Also, according to requirement, only one functional element, for example an electric heater 8 or a position sensor 7, can be provided.

Figure 4B:
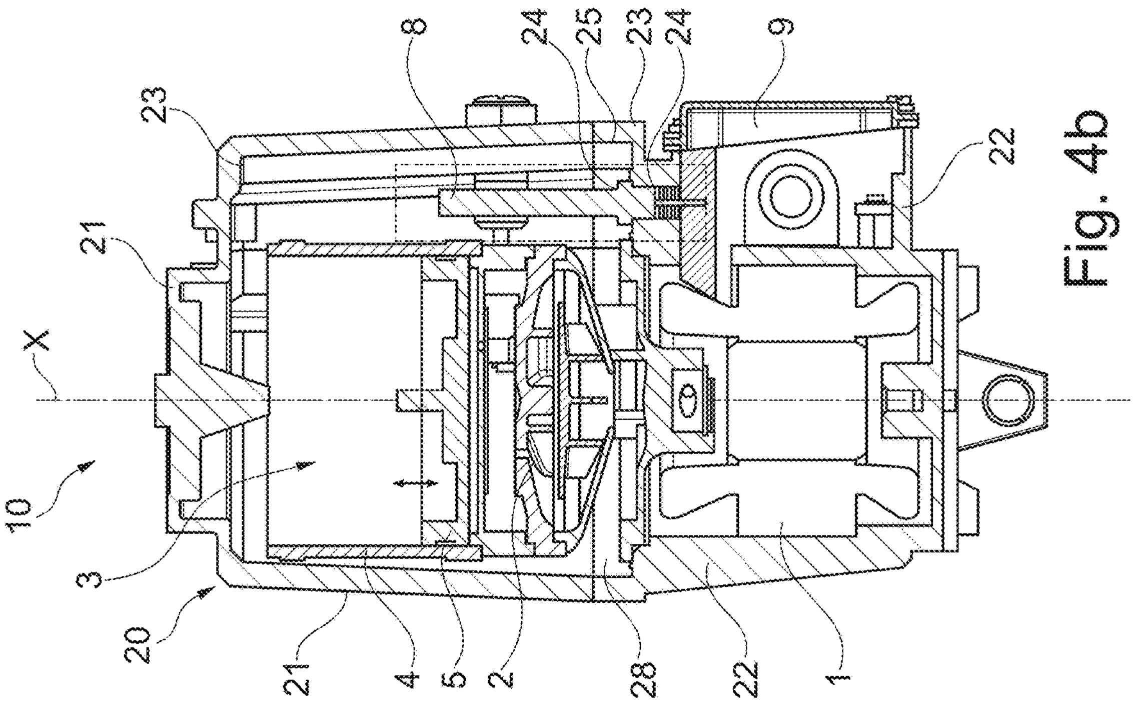
FIG. 4*b* shows a vertical sectional view of the electrohydraulic actuation device according to the embodiment of FIG. 4*a* with a section in the area of the heating means.
Figure 4A:
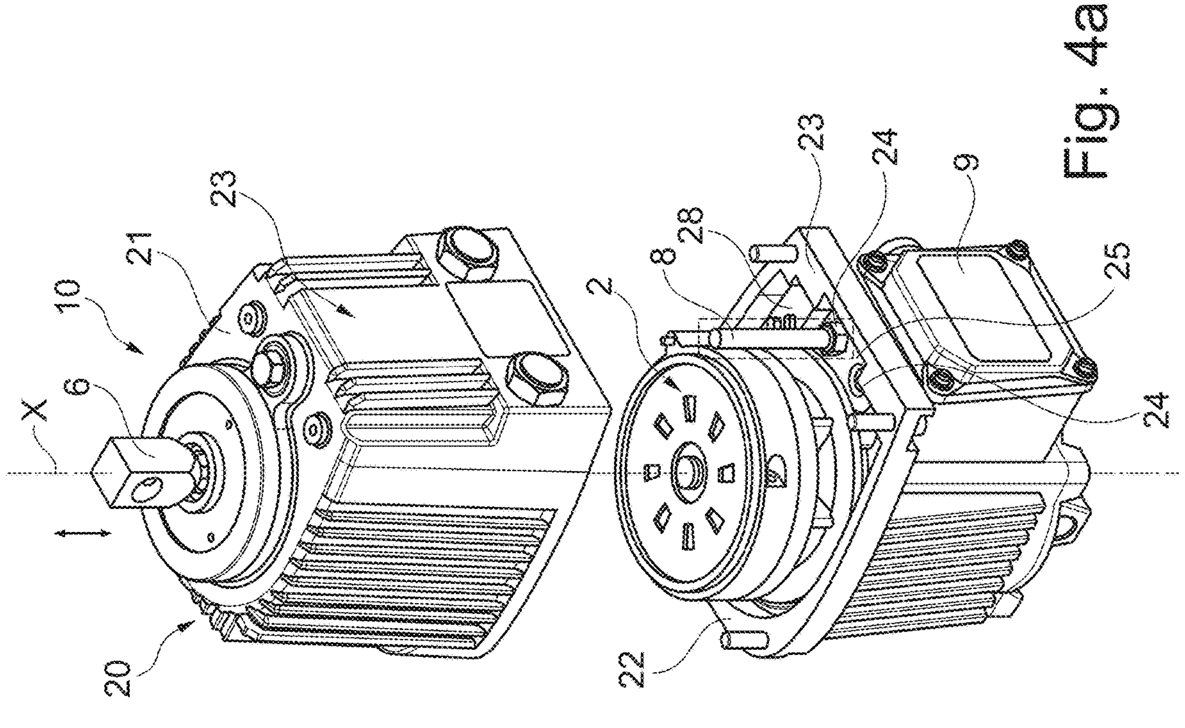
FIG. 4*a* shows a perspective view of a further embodiment of an electrohydraulic actuation device according to the invention with opened housing parts and a heating means.

In FIG. 4*a* and FIG. 4*b* in corresponding views, namely a perspective view with exploded view of housing parts 21, 22 (FIG. 4*a*) and a vertical sectional view (FIG. 4*b*), a further embodiment of the invention is shown. The section of the FIG. 4*b* is here carried out in the area of a heating means 8, so that the piston rod is not visible here. Substantially this further embodiment corresponds to the above-mentioned embodiment of FIG. 3*a*, FIG. 3*b*, with the difference that here, only a heating means 8 in the form of a heating rod projecting into the hydraulic oil is provided. The heating means 8 is here also mounted in a lateral enlargement 23 at the housing 20, namely the upper housing part 21. The heating means 8 extends along approximately half the height of the above housing part 21 and thus effects a relatively fast warming-up of the hydraulic oil during a start of operation of the electrohydraulic device 10. The heating means 8 is directly threadedly connected to a receiving opening 24 in the form of a connection opening provided with an inner thread at a partitioning bottom 28, and the electrical connections for the heat resistance of the heating means 8 are guided downwards into the area of the electrical terminal box 9 (see FIG. 4*b*). Otherwise, this further embodiment also substantially corresponds to the above-mentioned embodiments of the invention. An electric motor 1, preferably as a dry-running electric motor, is housed in a lower area of a housing part 22, and by means of driving the pump 2 in the hydraulic area of the hydraulic unit 3, the hydraulic oil is pressurized, so that the piston 5 is displaced upwards against the force of a coil spring (see movement arrow, FIG. 4*b*). The lateral radial enlargement 23 is here also realized accordingly shaped in a kind of rectangular convexity of the housing at least at the upper housing part 21 and at the flanges of the two housing parts 21, 22. Thus, a receiving area, provided lateral of the piston 5, is provided for the also optional additional modules, like for example electrical functional elements 7, 8 which are constructed in advance integrated in the hydraulic oil at this position. In this embodiment too, damage and impairment of the functional elements 7, 8 from the outside is effectively prevented in this way. A fast warming-up of the hydraulic oil is achieved by means of the heating means 8 projecting directly into the hydraulic part.

Figure 5:
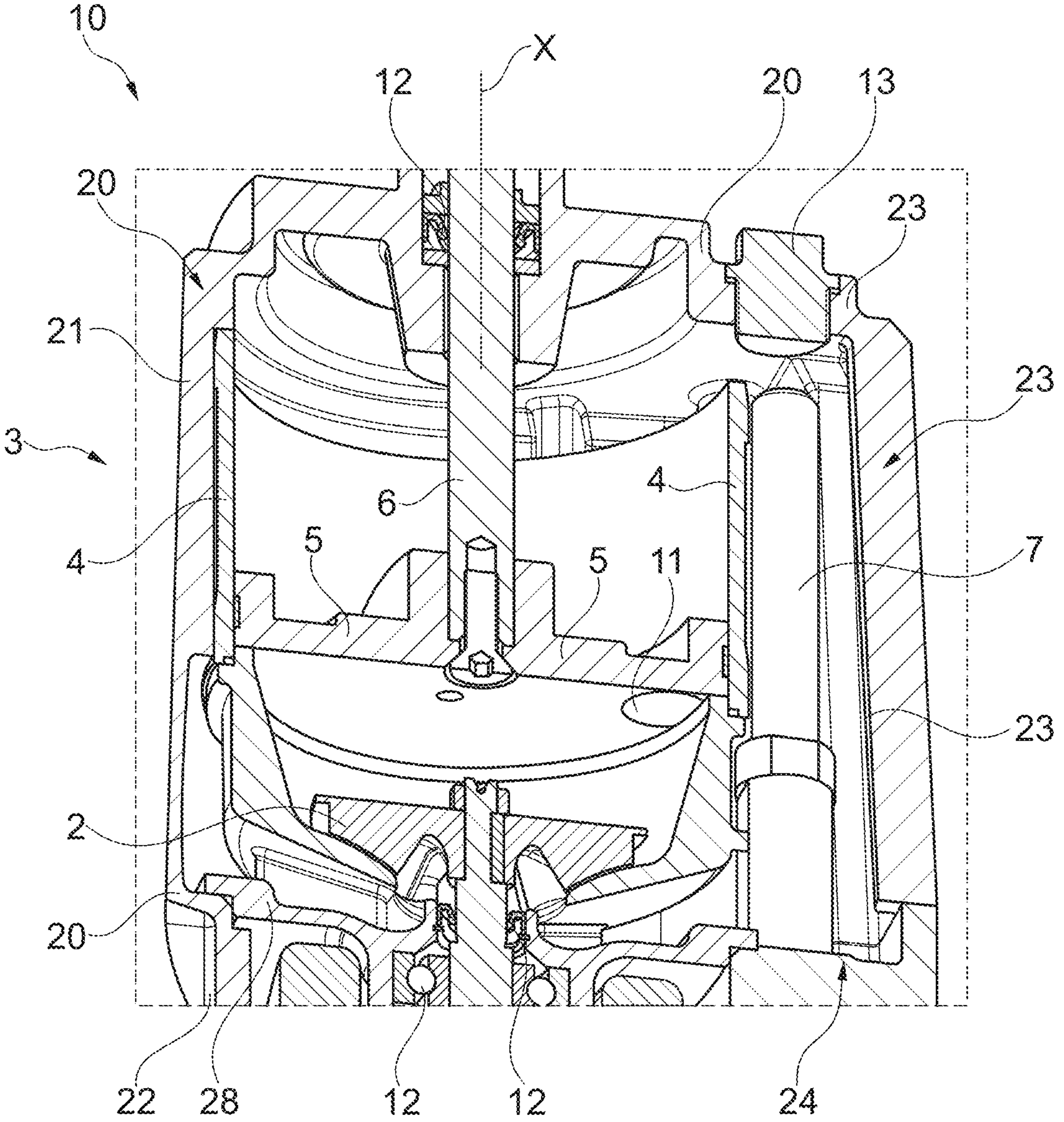
FIG. 5 shows a partial perspective cross-sectional view of a further embodiment according to the invention of an electrohydraulic actuation device.

In a perspective partial cross-sectional view in FIG. 5, a further embodiment of an electrohydraulic actuation device 10 according to the invention is shown, wherein here, only the upper hydraulic part of the device 10 is shown with the hydraulic housing part 21 opened in cross section and the elements lying inside it. Regarding the basic construction and the elements of the device 10, this embodiment does not differ substantially from the above-mentioned embodiments of FIG. 2 to FIG. 4*b*, except that at the piston 5 in the cylinder 4 of the piston-/cylinder unit, here the permanent magnet 11 is not mounted laterally at a radial outside of the piston 5, but instead at a front end of the piston 5 facing downwards. Alternatively, the axially aligned magnet 11 can also be mounted at the upper front end of the piston 5. A substantially circular permanent magnet is inserted in a deepening or recess and bore of the piston 5. The magnet 11 is positioned in a lateral edge area of the front end of the piston 5, so that it is positioned spatially very near to the sensor 7 provided laterally in the enlargement 23. Here too, a magnetic-induction sensor 7 or another sensor can be provided, which is configured for the position detection of the piston 5 in the inside of the cylinder 4.

In the embodiment shown in FIG. 5, a so-called Reed contact is mounted as sensor 7, which can detect very exactly in each case the end positions of the piston 5, that is, for example, an upper end position and a lower end position. In the case of the application of the electrohydraulic actuation device 10 as a brake thruster device, these would be the positions “brake opened” and “brake closed”. By means of the arranging of the magnets 11 or of the single magnet 11 at the front end of the piston 5, the sealing functions and the embodiment of the piston 5 are substantially unchanged in relation to conventional such pistons 5. Only at the front end, an extra magnet 11 is provided in the form of one magnet or of a plurality of magnets 11 mounted at respective distances from one another in the outside area of the front end of the piston 5. In the embodiment of the device 10 according to the invention shown in FIG. 5, furthermore in the area of the lateral enlargement 23 at the upper end of the housing 20, 21, in this example a plug 13 is provided, by means of which an access to the sensor 7 is made possible, for example for a replacement of the sensor or an adjustment and correction of the position of the sensor 7. This plug 13 is also partly provided in the above-mentioned embodiments of the invention, but not further described there. Furthermore, at the piston rod 6 and at the partitioning bottom 28 between the hydraulic part and the dry-running electric motor positioned therebelow, in each case one bearing or a plurality of bearings 12 or a bearing unit is provided. In addition, at these areas also seals are provided which ensure a sealing of the hydraulic part 21 of the housing 20.

The heating means 8 can be an electrically driven heating rod which is provided in encapsulated constructional shape, in order to be able to effect the warming of the oil in the hydraulic oil directly. In other respects, this embodiment corresponds substantially to the previous two embodiments, and a renewed description of the corresponding components and parts which are provided with same reference signs is therefore omitted in order to avoid repetition.

According to the invention, only one functional element 7, 8 can be provided in the lateral enlargement 23 of the housing 20 with correspondingly one receiving opening 24. Alternatively, a plurality of functional elements 7, 8, also more than two, can be mounted and assembled in the lateral space of the enlargement 23. Not-used receiving openings 24 can be closed with sealing plugs. Instead of a dry-running electric motor 1, also a wet-runner can be used as motor 1. The possibilities for use, the flexibility and the variability of the electrohydraulic actuation device 10 are thereby considerably increased by means of the invention.

The invention claimed is:

1. Electrohydraulic actuation device with an electric motor and a pump driven by the electric motor for the operation of a hydraulic unit, wherein the hydraulic unit comprises a positioning cylinder, a piston and a piston rod, wherein the piston rod serves as an actuation element and projects outward from a housing, wherein the housing comprises a lower housing part and an upper housing part, wherein the upper housing part is separated and sealed off from the lower housing part, wherein the electric motor is housed in the lower housing part, and the hydraulic unit is housed in the upper housing part, wherein the housing has at least in an area of the hydraulic unit a lateral enlargement as a local protrusion of the housing at least one side in relation to a longitudinal axis X of the device, beyond the circumference of the positioning cylinder and at least along a height of a stroke of the piston, wherein the lateral enlargement allows for electrical functional elements to be housed directly in the upper housing part, laterally adjacent to the hydraulic unit, wherein the housing comprises connections or receiving means for the electrical functional elements, and wherein the electrical functional elements comprise at least a contact-free, magnetic-induction sensor, which is arranged and configured for position detection of the piston by means of at least a magnet mounted thereon.

2. The electrohydraulic actuation device according to claim 1, wherein the lateral enlargement of the housing forms a lateral receiving area approximately rectangular in cross section for functional elements.

3. The electrohydraulic actuation device according to claim 1, wherein that the lateral enlargement is provided with connection openings to a terminal box for electrical connections.

4. The electrohydraulic actuation device according to claim 3, wherein the connection or receiving means of the electrical functional elements are provided in a partitioning bottom between the upper housing part and the lower housing part.

5. The electrohydraulic actuation device according to claim 1, wherein the electrical functional elements comprise at least an electric heating means which projects into the hydraulic oil of the hydraulic unit.

6. The electrohydraulic actuation device according to claim 1, wherein the lateral enlargement is provided above and in continuation to a terminal box for electrical connections of the device.

7. The electrohydraulic actuation device according to claim 1, wherein the housing at the inside of a wall of the lateral enlargement is provided with a recess for forming a receiving area for the electrical functional elements.

8. The electrohydraulic actuation device according to claim 1, wherein the electrical functional elements in the hydraulic part of the housing have an encapsulated constructional shape.

* * * * *